Jan. 30, 1951  E. WILDHABER  2,539,880
VARIABLE STROKE ENGINE
Filed June 26, 1946  4 Sheets-Sheet 1

FIG. 1

INVENTOR.
ERNEST WILDHABER
BY
Attorney

INVENTOR.
ERNEST WILDHABER
BY
Attorney

Jan. 30, 1951 E. WILDHABER 2,539,880
VARIABLE STROKE ENGINE
Filed June 26, 1946 4 Sheets-Sheet 3

ERNEST WILDHABER
INVENTOR.

BY *[signature]*
Attorney

Jan. 30, 1951 E. WILDHABER 2,539,880
VARIABLE STROKE ENGINE
Filed June 26, 1946 4 Sheets-Sheet 4

ERNEST WILDHABER
INVENTOR.

BY
Attorney

UNITED STATES PATENT OFFICE 2,539,880

VARIABLE STROKE ENGINE

Ernest Wildhaber, Brighton, N. Y.

Application June 26, 1946, Serial No. 679,553

20 Claims. (Cl. 74—60)

The present invention relates to engines, both of the internal combustion type and the steam type, and also to compressors or pumps. In particular, it relates to variable stroke engines and compressors. It will be described specifically hereinafter in connection with one embodiment as a variable stroke internal combustion type engine intended for automotive use.

In the engines conventionally used today in automobiles, the engine output is controlled by a throttle. These engines generally run at full load only a very small fraction of the time, and most of the time they are throttled down to a fraction of their full load capacity, which means a consequent loss in efficiency.

A variable stroke engine can operate under much more favorable conditions. A variable stroke engine can deliver power in a wide range, even at a given engine speed. The engine load can be reduced by reducing the stroke, and without resorting to high vacuum and lean mixtures. The combustion process itself can be kept close to the peak of efficiency nearly all of the time so that a marked saving of fuel is possible. A variable stroke engine is an economical engine which can nevertheless develop high power when needed. With a variable stroke engine, the shifting of gears is materially reduced, and if the stroke variation is made automatic, the variation in stroke of the engine itself to a large extent may supplant an automatic transmission.

All of these advantages have long been recognized, but such attempts as have been made heretofore to build variable stroke combustion engines have resulted in such poor designs that the engines have not come into commercial use. One of the chief drawbacks of previous designs has been the lack of proper mass balance in the engine. This prevents the engines from being run even at medium speeds, and high speeds are entirely out of the question. Another disadvantage with previous designs has been the lack of rigidity of the engines. Further than this, prior proposals have been complicated in construction and costly to produce.

One object of the present invention is to provide a variable stroke engine with proper mass balance, and particularly to provide a variable stroke engine having mass balance which is variable with variation in the stroke of the engine.

A further object of the invention is to provide a variable stroke engine having a plurality of cylinders disposed parallel to the engine axis and equally spaced about the engine axis, in which mass balance of the reciprocating parts is achieved by means of a fly-wheel whose plane is inclined to the engine axis at an increasing angle with increasing stroke of the engine.

Another object of the invention is to provide a variable stroke engine in which the compression ratio can be maintained constant for various lengths of stroke of the engine, or in which the compression ratio can be maintained in pre-selected relationship with the length of stroke.

A further object of the invention is to provide an engine of the character described in which the reciprocating motion of the engine pistons is transformed into rotary motion of the engine shaft through a wabble member, and in which adjustment of the bearing for this wabble member changes the angular position of the wabble member and controls the length of stroke of the engine.

Still another object of the invention is to provide an engine of the character described in which the wabble member is mounted upon a uniform motion type universal joint, whose one end is rotatably fixed, but which is adjustable to govern the length of engine stroke.

A still further object of the invention is to provide an engine of the character described having a relatively simple connection between the wabble member and the engine shaft through which the motion of the wabble member may be transmitted to the engine shaft in any angular position of adjustment of the wabble member.

Other objects of the invention are to produce a variable stroke engine which will be simpler in construction and less costly than the designs heretofore proposed.

Still further objects of the invention will be apparent hereinafter from the specification and from the recital of the appended claims.

The invention is illustrated in the drawings in connection with a barrel-type engine which has a plurality of cylinders arranged about the engine axis in parallelism thereto. The pistons in these cylinders are connected by ball and socket joints with rods that are connected, in turn, by other ball and socket joints, with a wabble member. This wabble member is mounted on a universal joint of the uniform motion type that is secured to a head which is adjustable axially of the engine to vary the length of stroke of the pistons. Axial adjustment of the head changes the angle of inclination of the plane of the wabble member to the axis of the engine. The wabble member is rigidly connected to a shaft which is journaled in a sleeve that forms part of a fly-wheel which serves to balance the engine. The sleeve has rollers secured at opposite sides of it which engage in slots of a head that is secured to the engine shaft. These slots are inclined to the axis of the engine shaft, and, as the wabble member is adjusted, the rollers adjust themselves inwardly or outwardly in the slots of the head to accommodate themselves to the change in angular position of the wabble member.

In the preferred embodiment of the invention, the fly-wheel has a general direction inclined to the axis of rotation of the shaft to which the wabble member is secured, and the front face of the fly-wheel does not lie in a single plane, but in two planes offset from one another. This provides complete mass balance.

The construction is such, that as the pistons reciprocate in their cylinders, the wabble member has a wabble motion back and forth about an axis perpendicular to the engine axis and also a slight motion in a plane perpendicular to the axis of its shaft, and this motion of the wabble member is transmitted through the fly-wheel, its sleeve and blocks, and the head of the engine shaft, to drive the engine shaft.

The engine shown in the drawings comprises a plurality of cylinders 20 which form part of a stationary engine block 22 of barrel shape to which the cylinders are rigidly secured. These cylinders are spaced equi-angularly about the engine axis 21 and are parallel or substantially parallel to that axis.

Mounted in each of the cylinders to reciprocate therein is a piston 23. Each of these pistons is connected by a ball and socket joint with a rod 24. Each of these ball and socket joints comprises a bearing cup 25 that is formed integral with the head of the piston 23, a ball 26, which is welded or otherwise secured to the rod 24, and a bearing cup 27 which is screwed onto the bearing cup 25. Each rod 24 is connected at its opposite end by means of a ball and socket joint to a wabble member 30. Each of these latter ball and socket joints comprises a ball 31 which is welded or otherwise secured to the rod 24, the bearing cup 32 which is integral with the wabble member 30, and the bearing cup 33 which threads into the bearing cup 32.

The rods 24 are preferably made of tubular construction and the outside diameter of the tubular portion of the rod, adjacent its ends, is no greater than and preferably smaller than the minimum inside diameter of the bearing cups 27 and 33. The bearing cups 27 and 33 may, therefore, be slid onto the rod before the spherical end pieces 26 and 31 are welded to the rod, and finish machining of the spherical end pieces may, therefore, be effected after the balls have been welded onto the rod. This insures accuracy. Moreover, with the tubular structure, very light connecting rods are obtained especially when the spherical end pieces 26 and 31 are made hollow.

The wabble member 30 is mounted pivotally on a spherical bearing 35 which in the position shown is centered at 36 on the axis 21 of the engine. The bearing 35 is mounted in a uniform motion universal joint. This joint may be of any suitable construction. That shown is the well-known Weiss-type universal joint. The joint comprises a relatively angularly stationary part 40 and a relatively movable part 41. The two parts are connected with the ball member 35 in a manner which will be described in more detail hereinafter. The part 41 is secured to the wabble member 30 and, in fact, is preferably integral therewith. The relatively angularly fixed part 40 is secured against a shoulder on a sleeve member 42 by a nut 43 and is keyed to this sleeve member. This sleeve member is adjustable, as will hereinafter be described in further detail, axially of axis 21 to effect adjustment of the stroke of the engine.

The wabble member has a general shape of a flat disc, but it has a shaft 44 secured to one side of it by means of a toothed face coupling 45 and screws 46. The axis 47 of this shaft passes through center 36 and is inclined to the axis 21 at an angle $a$.

Mounted on the shaft 44 by means of antifriction bearings 48 and 49 is a sleeve member 50. This sleeve member has a pair of coaxial pins 51 projecting from opposite sides of it, as shown particularly in Figs. 12 and 13. The axis 53 of these pins intersects the axis 47 of the shaft at right angles and in a point 52. Rotatably mounted on the pins 51 are rollers 54. These rollers are adapted to engage in slots 55 of the head 56 of the engine shaft 57. This shaft is rotatably mounted on antifriction bearings 58 and 59 in the dome-shaped housing 60 in such a way that the axis of the shaft is in alignment with the axis 21. The housing 60 is secured to cylinder block 22 by screws 62. The ways formed by the slots 55 are preferably made straight as will be explained further hereinafter, and are preferably inclined to the axis of shaft 57 at an angle greater than 45°.

The operation of this engine may be best understood by first assuming that it operates as a compressor rather than as a motor. In this event, power is applied through the engine shaft 57. At any given fixed position of the center 36, then, rotation of the engine shaft 57 will move point 52 in a circular path about axis 21. Hence, axis 47 describes a conical surface about axis 21 whose center lies at 36. The turning position of the wabble member 30 about its axis 47 is controlled by the uniform motion universal joint. This joint imparts a planetary motion to the wabble member, which, for any one position of adjustment of the wabble member, is as if the wabble member were operatively connected with the angularly stationary part of the universal joint by means of a pair of bevel gears of a one-to-one ratio whose common apex is at 36. One of these imaginary gears would be angularly fixed and coaxial with axis 21; the other would be part of the wabble member and have an axis 47.

The merit of a uniform motion universal joint, as distinct from an ordinary universal joint, is that it performs this function of uniform motion gearing at all shaft angles $a$ without backlash and without change in backlash. In this way, the wabble member is caused to wabble rather than to turn continuously in one direction and while the centers 65, 65' (Fig. 1) of the balls 31 do not remain exactly in the axial plane shown in Fig. 1, they remain always close to it and perform a general swinging motion back and forth, thereby reciprocating the pistons 23. All the points 65, 65' where the connecting rods are attached to go through identical motions when a uniform motion universal joint is used, and all the pistons 23 are moved in the same way in succession. This is an important prerequisite for proper mass balance, not obtainable with ordinary universal joints.

When the engine is used as a motor, the motions remain the same as described for a compressor. Only the torque is reversed and is then transmitted from the pistons to the engine shaft 57.

All of the center points 65, 65' of the ball joints 31 are disposed in a plane perpendicular to the axis 47 of the wabble member and passing through center 36. They are at a distance S from center 36 equal to 36—65, which is larger than the radius S' of the cylindrical surface which contains the axes 70 of the pistons.

If $a'$ denotes the maximum attainable angle $a$ of adjustment of the wabble member, distance S is preferably kept smaller than:

$$\frac{S'}{\cos a'}$$

In one embodiment distance S is made:

$$S = \frac{2S'}{1+\cos a'}$$

In other embodiments, distance S is selected intermediate the above value and S'.

During the operation of the engine, each point 65, 65' describes a curve in space which departs only slightly from its mean axial plane and which is known as a spherical lemniscate. The axial component of this motion is a harmonic motion. If $t$ denotes the turning angle of the engine shaft 57, the axial component $x$ of this motion, measured along axis 21 can be put down as:

$$x = S \sin t \sin a$$

The pistons move substantially in the same manner. For a definite length of stroke, whose angle $a$ fulfills the equation:

$$S = \frac{2S'}{1+\cos a}$$

the pistons move in exactly the same manner. For practical purposes and for the purpose of simplified explanation, the pistons can be considered as having a harmonic motion at any stroke equal to: $2S \sin a$. This will be referred to further below in connection with the discussion of mass balance.

Figure 7:
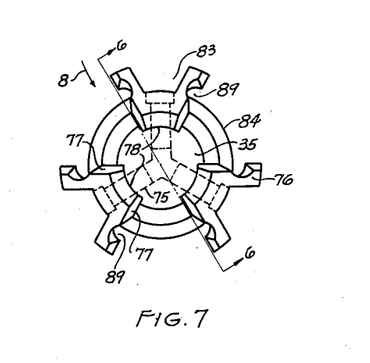
Fig. 7 is an axial view of these parts looking from the right in Fig. 6.
Figure 8:
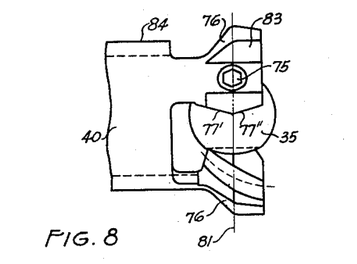
Fig. 8 is a view looking at these parts from above in Fig. 7 and in the direction of the arrow 8.

As previously described, the uniform motion universal joint comprises a relatively stationary member 40 which is secured to part 42, and a movable member 41 which is secured to the wabble member 30. The angularly stationary part 40 comprises three equally spaced prongs or projections 76 and the central sphere 35 which is secured to member 40 by means of radial bolts 75 (Figs. 6, 7 and 8) which pass through holes in these prongs and seat in holes provided in the sphere 35. These prongs have also cylindrical inside surfaces 78, which fit into straight slots 80 provided on the sphere 35. The sides 77 of the prongs are generally radial but are beveled off on both sides of the central plane 81, as shown in Fig. 8 at 77', 77'', to prevent interference with the movable part of the joint. The surfaces 77', 77'' are planes which intersect in a radial line of the central plane 81 of the joint.

Each of the prongs 76 also has grooves 89 provided in its generally radial sides 77. The center line 91 of each groove (Fig. 6) is a circular arc centered at a point 90 which is offset from the point 36 along axis 21. The plane of its circle passes, however, through point 36. The grooves 89 have a circular cross-section of constant radius and form races or guides for balls 92 of the same or substantially the same radius, so that the balls fit the curved races on a large portion of their circumference. The grooves 89 have a maximum depth of substantially the radius of the balls at the central plane but become gradually shallower on the sides on account of the bevel of the sides 77', 77'' of the prongs. Each of the prongs 76 is also formed exteriorly with a V-shaped groove 83 that has a cylindrical bottom which is really an extension of the outside cylindrical surface 84 of the shank portion of the member 40.

The mating movable part 41 of the universal joint is constructed in the same way as the stationary part. It contains like prongs, like circular raceways for the balls, etc., but in the case of the movable member the raceways are centered on the axis 47 of wabble member 30 at 94.

In the operation of the universal joint, the balls, constrained by the mating grooves whose center lines cross each other, always remain in a plane perpendicular to the plane of the two axes 21, 47 and passing through the center 36, and bisecting the angle included between the two axes. Thus, the required planetary motion is obtained.

The movable part of the joint is part of the wabble member 30 and fits sphere 35 not only with its prongs but also adjacent axis 47 to form a sufficient bearing surface. The sphere is first placed into that part of the wabble member shown at the left in Fig. 1 which contains the larger part of the sphere surface, by sliding the prongs of that part of the wabble member into the slots 80 provided on the sphere. Then the sphere is turned to permit its assembly with the stationary member 40 after the slots 80 in the sphere have been aligned with the prongs 76 of the stationary part.

It should be understood that other uniform motion universal joints may be used in connection with the present invention, if desired.

The stationary part 40 of the universal joint is mounted in a cup-shaped member 95, that is secured by screws 96 to the engine block 22. This cup-shaped member 95 is slotted at its right end (Fig. 1), to provide fingers 97 which engage in the grooves 83 of the prongs 76 of the member 40. The member 95 serves as a guide for the universal joint member 40 in the axial adjustment of that member, and it maintains the universal joint member 40 in angularly fixed position through the engagement of its fingers in the grooves of the prongs of the universal joint member.

Figure 1:
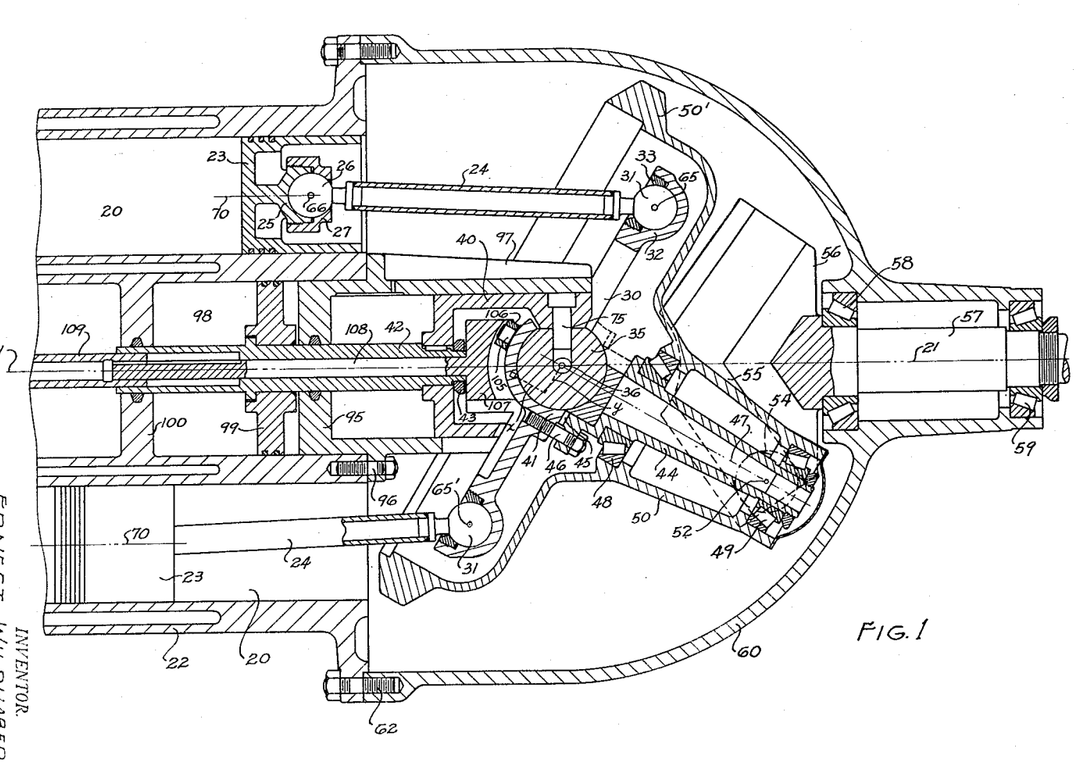
Fig. 1 is a fragmentary axial sectional view of an engine built according to one embodiment of the present invention, the section being taken along the line 1—1 of Fig. 3, and one end of the engine being broken away.

The left-hand end of the cup-shaped member 95 serves as one end wall of a cylinder 98 in which the piston 99 is reciprocally mounted. The other end wall is denoted at 100. This piston is rigidly secured in any suitable manner to the hollow shaft 42, as, for instance, by welding. Movement of the piston 99 in the cylinder 98 can be effected by fluid-pressure which may be admitted in the conventional manner to opposite sides of the piston 99 through suitable ducts drilled into the cylinder block 22. A suitable valve (not shown) is provided to control supply and exhaust of fluid-pressure to and from the cylinder 98. In Fig. 1, the piston 99 is shown in its extreme position to the right and the wabble member 30 is, therefore, in its extreme position of tilt. By admitting fluid to the right-hand end of the piston 99 and exhausting it from the left-hand end, the piston 99 may be moved to the left, causing the wabble member 99 to be swung about center 36. As the piston 99 is adjusted to the left, the wabble member 30 is adjusted more nearly toward a vertical position in Fig. 1 and the rollers 54 move inwardly in the guideways 55 of the head 56 of the engine shaft 57.

The movement of the piston 99 may be effected through manual operation of the controlling valve or it may be effected automatically.

The operation of the pistons 23 may be controlled with known forms of valves or sleeve members. It has not been deemed necessary to show any such valves or sleeves since they form no part of the present invention. For their operation, power may be taken off of the pin 105 (Fig. 1) which is secured to the wabble member 30. This pin carries a sliding block or roller 106 that engages in a head 107. The head 107 is integral with a shaft 108 that is journaled in the hollow shaft 42. The shaft 108 turns like the engine shaft 57 regardless of the length of stroke of the engine. It is, however, adjustable axially with the member 40. It transmits its turning motion to a coaxial shaft 109 into which it telescopes and that is axially fixed, by means of a sliding key connection. The shaft 109 furnishes the power to operate the valves or sleeves that control the movements of the pistons 23, the ignition if any, and other controlling parts.

As has already been stated, with an engine constructed according to the present invention it is possible to maintain a constant compression ratio regardless of the length of stroke. Also, it is possible to vary the compression ratio in any predetermined desired manner with the length of stroke. This is illustrated diagrammatically in Fig. 2. Starting, for instance, with the maximum stroke, which corresponds to an inclination $a'$ between axis 21 and wabbler axis 47, point 110 is determined on line 65—65' by plotting a distance 65'—110 outwardly from point 65' equal to distance 65'—65 divided by the desired compression ratio minus one. Thus, if a compression ratio of six-to-one is desired, that is, if the volumes between a piston 23 and the left-hand wall of the cylinder at opposite ends of the piston stroke are in the ratio of six-to-one, one-fifth of distance 65'—65 is plotted as distance 65'—110. Then, the latter is one-sixth of the total distance 65—110.

Figure 2:
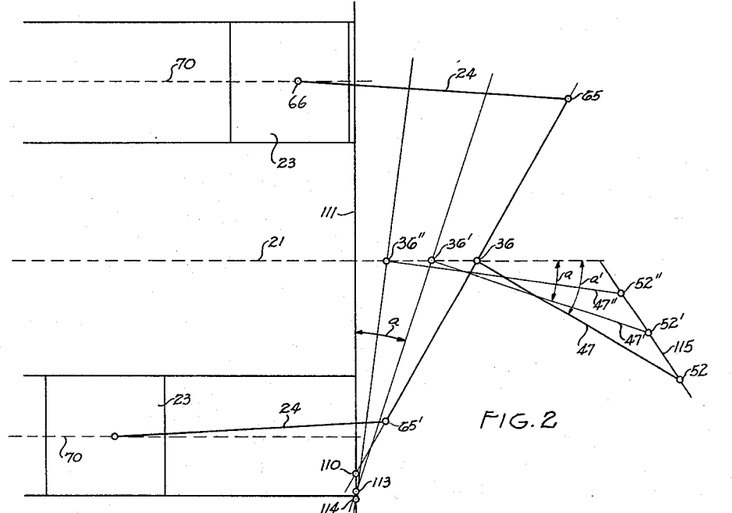
Fig. 2 is a diagrammatic view corresponding to this axial section and explanatory of how stroke adjustment may be made in this engine and also of how a constant compression ratio may be maintained at any length of stroke.
Figure 3:
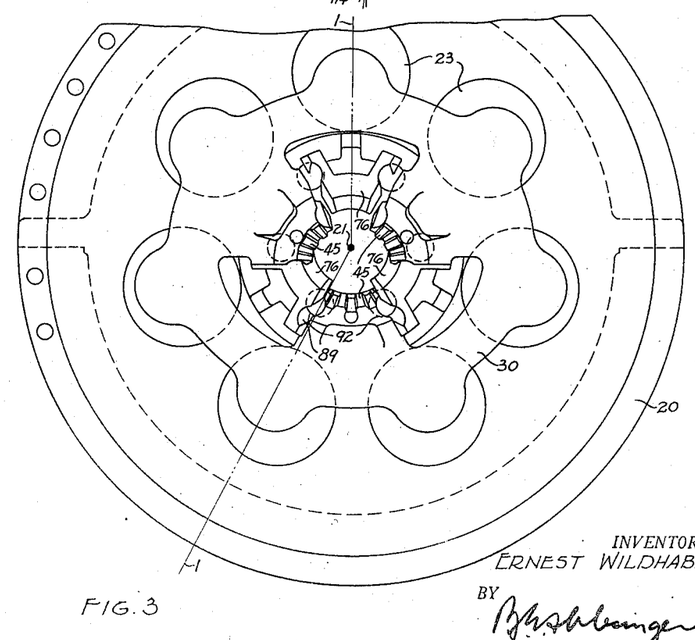
Fig. 3 is a view looking at the wabble member from the right-hand side of Fig. 1 and in the direction of the engine axis, parts of the clutch being broken away to show the structure of the members of the universal joint.
Figure 4:
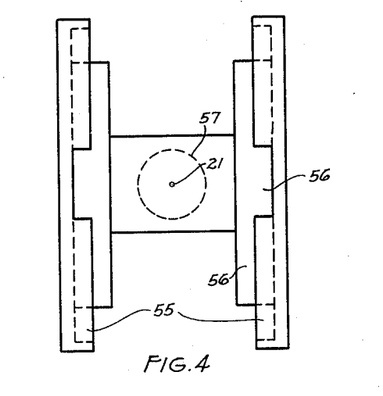
Fig. 4 is a detail view looking at the head of the engine shaft from the left in Fig. 1.
Figure 5:
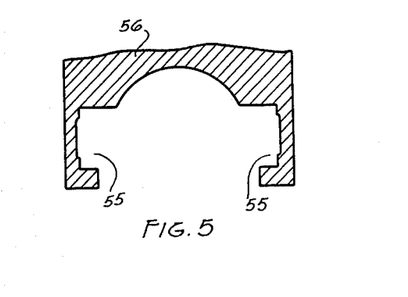
Fig. 5 is a section through the head taken perpendicular to one of the guide-ways.

To obtain the same compression ratio when center 36 is at 36', draw a line 111 through point 110 perpendicular to axis 21, and draw a circle about point 36' with a radius equal to the distance 36—110. This circle intersects line 111 at a point 113. Line 36'—113 is then inclined to line 111 at the required inclination angle $a$ of the wabble member to give the same compression ratio at the reduced stroke as when the wabble member center was at 36. Likewise, line 36''—114 gives the inclination of the wabble member, required to achieve the same compression ratio, when its center is at 36''. As before, the same distance 36—110 is struck off from new center position 36'' to determine the position of point 114.

If different compression ratios are desired for different lengths of stroke, the distance 36—110 is varied accordingly with the different positions of the wabble center, that is, with the different strokes. In each case, the angle $a$ for any given position of center 36 may readily be determined.

The path of point 52 can now be found by plotting a constant distance 36—52 from center 36 along the wabble axis 47. Thus, distance 36'—52' is plotted with the wabble axis at 47', which is perpendicular to line 36'—113, determining point 52'. Point 52'' is determined likewise for the position where the center is at 36'' and the wabble axis at 47''. The shown points 52, 52', 52'' are for a constant compression ratio. They are located on a line which is slightly curved, less curved than a circle of radius 36—52. The curve can be sufficiently approximated by a straight line 115. A straight path may be substituted for the curve, therefore, which makes manufacture of the head 56 and, therefore, of the engine simpler. The curve has a general inclination larger than 45° to the engine axis 21.

In the embodiment shown, the head 56 of the engine shaft is provided with two pairs of guide paths 55 symmetrically disposed at opposite sides of the axis of shaft 57. Only one of these pairs of paths is actually used in operation of the engine. The other symmetrical part of the head serves merely to effect a symmetrical design for the head which is inherently mass-balanced. A mass-balanced unsymmetrical construction is also possible, however.

A guide path rather than a linkage is preferred in the head of an engine constructed according to the present invention because it allows use of a straight line path and it simplifies massbalance. While rollers 54 are employed in the embodiment shown to engage the path 55 in the head of the engine shaft, it is to be understood that sliding blocks might be substituted for the rollers if desired.

As has already been stated, one of the problems with variable stroke engines has been to attain mass balance. The manner in which this problem has been solved by the present invention will now be described.

In order to achieve mass-balance, the inertia effects of the pistons, of the connecting rods, of the wabble member, and to a minor extent of the balls of the universal joint have to be balanced. One end of each connecting rod partakes, for instance, of the movement of the piston which is connected to that connecting rod, while the other end partakes of the motion of the wabble member.

It is sufficient for the purpose of explanation to assume that the mass of each connecting rod is split up into two equal portions, one acting at the center 65 of the wabble member and the other acting at the center 66 of the ball joint which connects the connecting rod with the piston. In other words, the mass of a piston is assumed increased by half the mass of its connecting rod. Likewise, the mass of the wabble member is assumed increased by half the mass of a connecting rod at each of the points 65.

This leaves only two main members, the pistons and wabble member, and the mass-balance of the balls to be considered. Let M denote the mass of each piston, $n$ the number of pistons, $M'$ the mass of a connecting rod, $M''$ the mass of the wabble member, $w$ the uniform angular velocity of the engine shaft, and $a$ the angle included between the axes 21 and 47. Also, let $$M_2 = M + \tfrac{1}{2} M'$$

When a mass $M_2$ performs a harmonic motion at an angular velocity $w$ and a total stroke of $2S.\sin a$, its maximum inertia load is found to amount to:

$$w^2 (S.\sin a) M_2$$

With a plurality of cylinders in excess of two, that is, with three or more cylinders, the inertia load of all the masses $M^2$ are found to add up to a turning moment T in the plane of axes 21 and 47 which amounts to:

$$T = \tfrac{1}{2} w^2 (S.\sin a) M_2.S'.n$$

and which turns in a clockwise direction, when considering Fig. 1. This moment stays constant, as well known, and its plane rotates with the engine axis. There are no unbalanced forces, only the above moment or couple.

It can be demonstrated mathematically that no unbalanced forces exist when the center of gravity of the wabble member coincides with center 36, and that then the inertia loads add up to a moment T', where:

$$T' = w^2.\sin a [\cos a.I_x + (2 - \cos a) I_y]$$

Here, $$I_x = \int dm x^2$$

and $$I_y = \int dm y^2$$

where $x$ and $y$ are the coordinates of any one mass element $dm$, as indicated in Fig. 1. $x$ is measured parallel to the axis 47 and $y$ is measured at right angles thereto. This moment turns in the same direction as moment T.

The integral functions for $I_x$ and $I_y$ embrace all mass elements of the wabble member, not merely those of the axial plane shown in Fig. 1. The above formula for T' also holds true when the center of gravity of the wabble member lies at any distance $x_g$ from center 36 on axis 47. In such a case, however, there exists an unbalanced radial inertia load P or force amounting to:

$$P = w^2.M''.x_g.\sin a$$

Moreover, in either case, the moment T'' is added to moment T' which is caused by the connecting rods, half of whose masses have been assumed as acting at centers 65. This moment is in the same direction as moments T and T', that is, it tends to turn the wabble member in a clockwise direction in the position shown in Fig. 1, like the inertia loads of the piston. Moment T'' amounts to:

$$T'' = \tfrac{1}{4} w^2.\sin a\ (2 - \cos a) S^2.M'.n$$

as can readily be demonstrated.

The total moment of the inertia loads about center 36 therefore amounts to:

$$T + T' + T''$$

This moment, as well as the inertia load P, increases with increasing angle $a$, that is, with increasing engine stroke.

According to the present invention, a counterbalance is provided which also increases in effect with increasing angle $a$. The fly-wheel member 50 is designed as a mass-balancer by providing a generally disc-like portion 50'. A pair of equal mass elements 120, 120' disposed on line 120—36—120' at equal ordinates $y$ are subjected to equal and opposite radial inertia loads which effect a turning moment in counterclockwise direction about point 36 opposite to the above said inertia moment $(T+T'+T'')$ because at any one fixed position of adjustment, member 50 rotates as if rigidly connected with the engine shaft 57.

What is true for mass elements is also found true for finite masses and for disc-shaped members. They are all adapted to produce turning moments opposite to the inertia moments of the pistons, connecting rods, and wabble member, and which, moreover, increase with increasing angle $a$ of adjustment.

In the preferred embodiments of the invention, the center of gravity of the member 50 is located on axis 47 and either coincides with center 36 or is offset therefrom a distance $x_b$. Thus, the center of gravity may be at 122 (Fig. 12) at a distance $x_b = 36 - 122$ from the center 36. It is displaced in the shown direction from the center 36, when the center of gravity of the wabble member 30 is displaced in the opposite direction from center 36, for instance, when it is at 121 at a distance $$x_g = 36 - 121 \text{ from } 36.$$

A radial inertia load results when the center of gravity differs from center 36. This radial inertia load P'' amounts to:

$$P'' = w^2.M_3.x_b.\sin a$$

where $M_3$ denotes the mass of member 50. It should be equal and opposite to the force P, for mass balance. It is opposite when $x_b$ and $x_g$ are opposite, as shown. It is equal when the following equation is fulfilled:

$$M_3.x_b = M''.x_g$$

The disc-like portion of member 50 may be symmetrical with reference to the axis 47 in all respects. In this event, the axis 47 and line 125 perpendicular thereto are principal directions of mass distribution. If $I''_x = \int dm x^2$ and $I''_y = \int dm y^2$ on member 50, its moment about center 36 is found to amount to:

$$T_2 = w^2.\sin a.\cos a\ (I''_y - I''_x)$$

The abscissas $x$ in $I''_x$ are to be measured from a plane passing through center 36 and which is perpendicular to axis 47, and the ordinates $y$ in $I''_y$ are the distances of the mass element from a plane which contains axis 47 and is perpendicular to the plane of the drawing of Fig. 1. The inertia moments are balanced when:

$$T_2 = (T + T' + T'')$$

which can be transformed into:

$$\sin a.\cos a\ (I''_y - I''_x - I_x) = \sin a.\tfrac{1}{2} n.M_2.S.S' + \sin a\ (2 - \cos a)(I_y + \tfrac{1}{4} n.M'.S^2)$$

It is apparent that this equation cannot be exactly fulfilled at all angles $a$ used in the stroke adjustment, for the first term increases at a slower rate than $\sin a$ as it is multiplied by $\cos a$, while the second term increases with $\sin a$, and the third term increases faster than $\sin a$ with increasing angle $a$. As an example, let it be assumed that the sum of the second and third terms change substantially in direct proportion to the arc of angle $a$ and to the angle $a$ itself. This means that the moment at the right-hand side of the equal sign in the above equation, plotted as an ordinate in the diagram of Fig. 9, corresponds to a straight line 126, when the angle $a$ is plotted as the abscissa. The moment at the left-hand side of the equal sign then corresponds to a curve 127, when the moments are made to match at very small angles $a$. Curve 127 is then tangent to line 126 at the origin O and departs increasingly from the line 126 with increasing angle $a$.

Figure 9:
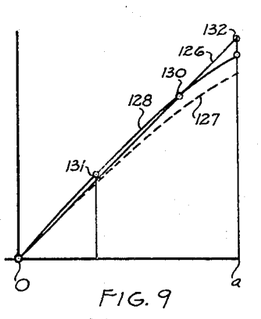
Figs. 9 to 11 inclusive are diagrammatic views illustrating certain principles of mass-balance underlying the invention.

This showing can be bettered by increasing the factor $(I''_y - I''_x - I_x)$ until the curve 128, which expresses this moment, intersects line 126 at a point 130 located between the end points 131 and 132 of the range of adjustment of the wabble member.

In the preferred embodiment of the invention, the mass-balance is very materially improved by providing a different arrangement on member 50. In the embodiment referred to in the diagram of Fig. 9, the directions along axis 47 and perpendicular thereto are principal directions of mass distribution, the latter direction being the major principal direction. That is, the quantity $I''_y$ is a maximum for ordinates taken in that direction.

In general, the quantity $I''_y$ together with the quantity $I''_x$ change when the inclination of the coordinates system is changed, that is, when the ordinates are measured in a direction inclined to line 125. In accordance with my invention, the quantity $I''_y$ is a maximum when the $y$-direction is inclined to line 125 at an angle $a''$ so that it includes an angle $b$ with a plane perpendicular to the engine axis, where $b$ is smaller than $a$. $b = a - a''$.

Figure 10:
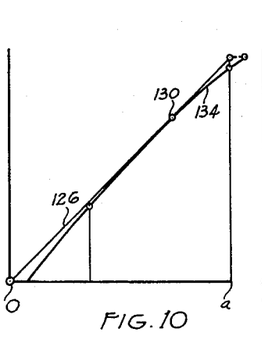
Figure 11:
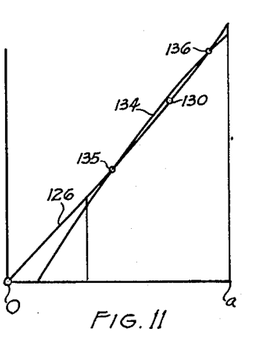

While the desired inclination $a''$ is only slight and always less than ten degrees, it has a very important effect indicated in the diagram of Fig. 10. The moment containing factor $(I''_y - I''_x - I_x)$ can now be expressed by a curve 134 which does not have to pass through origin O, and which can be kept tangent to line 126 at any desired point 130. Further than this, the departure of the curve 134 from line 126 can be reduced by shifting the curve 134 slightly to the left so that instead of being tangent to line 126 it intersects said line in two points 135 and 136. In this way the slight maximum departure shown in Fig. 10 can be cut in half. Fig. 11 illustrates such intersections for the case where the line 126 is a curve rather than a straight line.

In proceeding to design an engine according to this invention, one usually starts with the constants S, S', $n$ and the quantities $I_y$, $I_x$, M', $M_2$ are made as small as compatible with the required strength so that only $(I''_y - I''_x)$ and $a''$ need to be determined in the equation where:

$$\sin(a-a'') \cdot \cos(a-a'') \cdot (I''_y - I''_x) - \sin a \cos a . I_x$$

is used on the left-hand side. In accordance with my invention, these two quantities are so determined that the curve expressing the above moment most closely follows the given curve or line 126. This problem can be solved with the known methods of mathematics. It can also be solved graphically by trial.

Figures 12, 13:
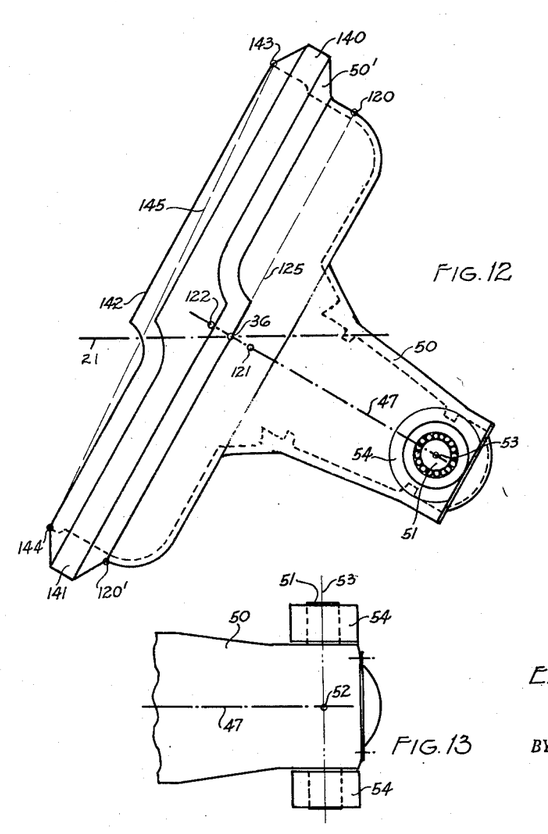
Fig. 12 is an elevation of the mass-balancing fly-wheel employed in the engine.
Fig. 13 is a fragmentary view of the sleeve portion of this fly-wheel taken at right angles to the view of Fig. 12.

Member 50 illustrated in Figs. 1 and 12 contains a major principal direction 145 of mass distribution inclined to a plane perpendicular to its axis 47. This distribution is accomplished in the illustrated embodiment of the invention by using mass portions 140 and 141 which are offset from one another. The mass-balance member 50 is generally made circular, although so far as action is concerned, it need not be circular. By using offset portions on a generally circular member, it is a small problem, however, to maintain the center of gravity on the axis 47. The member 50 shown has a front face 142 facing the pistons, whose extreme points 143 and 144 lie in a straight line 145 inclined to a plane perpendicular to the axis 47 of the fly-wheel.

One of the pronged elements of the uniform motion universal joint is kept stationary except for axial adjustment and requires no mass-balance. The other pronged element is part of the wabble member and has been considered with the wabble member. Only the balls of the universal joints need further consideration.

Figure 6:
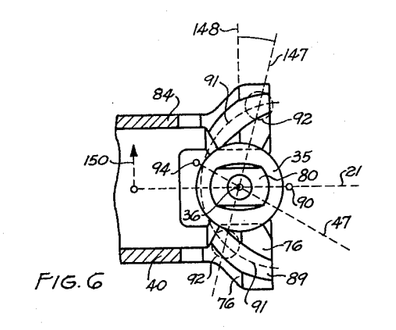
Fig. 6 is a sectional view on the line 6—6 of Fig. 7, showing the angularly stationary part of the spherical bearing for the wabble member and the angularly stationary part of the uniform motion universal joint which is combined with this spherical member.

The balls move in stationary circular races 89 so that the center of any one ball moves back and forth on a center line 91 centered at 90. The line 147, which connects the ball center with the center 36, includes an angle $i$ with the plane 148 perpendicular to axis 21, which is defined as:

$$\tan i = \tan a . \sin t$$

where $t$ denotes the turning angle about the engine shaft. With this known motion of the balls, their mass effects can be determined with known methods. It can be demonstrated further, that approximately the inertia forces of all the balls add up to a resultant radial force 150 in the plane of the axes 21 and 47, as indicated in Fig. 6. It rotates with the engine shaft. It exerts a turning moment about center 36 which should be allowed for in the above equation of turning moments. Likewise, the force should be allowed for in the above equation for forces. In this way, the desired mass balance even of the balls is obtained.

From the preceding description, then, it will be seen that mass-balance of the reciprocating parts is effected by means of the fly-wheel whose plane is inclined at an increasing angle with increasing stroke of the engine. The inertia moment of the flywheel counteracts and balances the inertia moment of the pistons, connecting rods, and wabble member; and both moments increase with increasing inclination of the wabble member and therefore effect suitable mass balance at all angles $a$. An engine built according to the present invention can, therefore, be run at high speed and at any stroke length without undue vibration.

While several different embodiments of the invention have been described, it is to be understood that the invention is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In apparatus of the character described, a plurality of cylinders angularly spaced about a common axis, pistons reciprocable in said cylinders, a wabble member inclined to said axis and mounted to pivot about a point lying in said axis, means for adjusting the position of said pivot point axially of said axis, means operatively connecting the pistons to the wabble member so that as the pistons reciprocate the wabble member wabbles about its pivot, an axially fixed shaft mounted coaxial of said axis, and means operatively connecting said shaft with the wabble member so that as the wabble member wabbles the shaft rotates, said last named connection being such, also, as to change the inclination of the wabble member upon axial displacement of its pivot, said last-named connection comprising a mass-balance member mounted coaxial with the wabble member to rotate thereon, and means for connecting said mass-balance member with said shaft to rotate therewith.

2. In apparatus of the character described, a plurality of cylinders angularly spaced about a common axis, pistons reciprocable in said cylinders, a wabble member mounted to pivot about a point lying in said axis, means operatively connecting the pistons to the wabble member so that as the pistons reciprocate the wabble member wabbles about its pivot, an axially fixed shaft mounted coaxial of said axis, and means operatively connecting said shaft with the wabble member so that as the wabble member wabbles the shaft rotates, said last named connection being such, also, as to change the inclination of the wabble member upon axial displacement of its pivot, said last-named connection comprising a mass-balance member of circular cup shape mounted on said wabble member coaxial therewith to rotate thereon, and means for connecting said mass-balance member with said shaft to rotate with the shaft, said mass-balance member having a larger diameter than said wabble member.

3. In apparatus of the character described, a plurality of cylinders angularly spaced about a common axis, pistons reciprocable in said cylinders, a wabble member inclined to said axis and mounted to pivot about a point lying in said axis, means for adjusting the position of said pivot point axially of said axis, means operatively connecting the pistons to the wabble member so that as the pistons reciprocate the wabble member wabbles about its pivot, an axially fixed shaft mounted coaxial of said axis, and means operatively connecting said shaft with the wabble member so that as the wabble member wabbles the shaft rotates, said last named connection being such, also, as to change the inclination of the wabble member upon axial displacement of its pivot, said last-named connection comprising a mass-balance member of cup form journaled on said wabble member coaxial therewith, and means for connecting said mass-balance member to rotate with said shaft, the centers of gravity of said mass-balance member and of said wabble member lying on the axis of the wabble member.

4. In apparatus of the character described, a plurality of cylinders angularly spaced about a common axis, pistons reciprocable in said cylinders, a wabble member having an axis disposed at an angle to said common axis and passing through a point lying in said common axis, said wabble member being mounted to be adjustable in the direction of said common axis, means operatively connecting the pistons to the wabble member, an axially fixed shaft mounted coaxial with said common axis, means operatively connecting said shaft with the wabble member, said last named connection being such, also, as to change the inclination of the wabble member upon axial displacement of its pivot and to constrain the axis of the wabble member to describe a conical surface about said shaft upon rotation of said shaft, means for constraining said wabble member to perform a uniform planetary motion about said common axis in any one fixed position of its adjustment, a mass-balance member journaled on said wabble member coaxial therewith and adapted to move as if rigidly connected with the shaft at any one fixed position of adjustment of the wabble member, the centers of gravity of said mass-balance member and of said wabble member lying on the axis of the wabble member but at opposite sides of its pivot.

5. In apparatus of the character described, a plurality of cylinders angularly spaced about a common axis, pistons reciprocable in said cylinders, a wabble member having an axis disposed at an angle to said common axis and passing through a point lying in said common axis and being adjustable in the direction of said common axis, means operatively connecting the pistons to the wabble member, an axially fixed shaft mounted coaxial of said common axis, means operatively connecting said shaft with the wabble member, said last named connection being such, also, as to change the inclination of the wabble member upon axial displacement of its pivot and to constrain the axis of the wabble member to describe a conical surface about said shaft upon rotation of said shaft, means for constraining said wabble member to perform a uniform planetary motion about said common axis in any one fixed position of its adjustment, a mass-balance member journaled on said wabble member coaxial therewith and adapted to move as if rigidly connected with said shaft at any one fixed position of adjustment of the wabble member, said mass-balance member having its major principal direction of mass distribution inclined to a plane perpendicular to the axis of the wabble member.

6. In apparatus of the character described, a plurality of cylinders angularly spaced about a common axis, pistons reciprocable in said cylinders, a wabble member having an axis disposed at an angle to said common axis and passing through a point lying in said common axis and being adjustable in the direction of said common axis, means operatively connecting the pistons to the wabble member, an axially fixed shaft mounted coaxial of said common axis, means operatively connecting said shaft with the wabble member, said last named connection being such, also, as to change the inclination of the wabble member upon axial displacement of its pivot and to constrain the wabble member to describe a conical surface about said shaft upon rotation of said shaft, means for constraining said wabble member to perform a uniform planetary motion about said common axis in any one fixed position of its adjustment, a mass-balance member journaled on said wabble member coaxial therewith and adapted to move as if rigidly connected with the engine shaft at any one fixed position of adjustment of the wabble member, said mass-balance member having its major principal direction of mass distribution inclined to a plane perpendicular to the axis of the wabble member at an angle smaller than ten degrees and in a direction such that its inclination to a plane perpendicular to said common axis is less than the inclination of the wabble member to that plane.

7. In apparatus of the character described, a plurality of cylinders angularly spaced about a common axis, pistons reciprocable in said cylinders, a wabble member having an axis disposed at an angle to said common axis and passing through a point lying in said common axis and being adjustable in the direction of said common axis, means operatively connecting the pistons to the wabble member, an axially fixed shaft mounted coaxial of said common axis, means operatively connecting said shaft with the wabble member, said last named connection being such, also, as to change the inclination of the axis of the wabble member upon axial displacement of its pivot and to constrain the axis of the wabble member to describe a conical surface about said shaft upon rotation of said shaft, means constraining said wabble member to perform a uniform planetary motion about said common axis in any one fixed position of its adjustment, a mass-balance member mounted on said wabble member coaxial therewith to rotate thereon, said member being connected to rotate with the engine shaft in any position of adjustment of the wabble member, the side of said mass-balance member facing the pistons having a general inclination to a plane perpendicular to the axis of the wabble member.

8. In apparatus of the character described, a plurality of parallel cylinders angularly spaced about a common axis, pistons reciprocable in said cylinders, an angularly stationary spherical bearing centered at a point on said axis and adjustable along said axis, a wabble member pivotally mounted on said bearing, operative connections between the wabble member and the pistons so that one moves on movement of the other, an axially fixed shaft coaxial with said axis, means operatively connecting the wabble member and said shaft so that one moves on movement of the other, said last named connecting means being so constructed as to change the inclination of the wabble member upon axial displacement of said joint whereby to change the length of stroke of the pistons, and means cooperating with said spherical bearing to constrain said wabble member to perform a uniform planetary motion on uniform rotation of said axially fixed shaft comprising an angularly stationary member fixed relative to said bearing, a cooperating member secured to the wabble member, and a plurality of intermediate members movable with respect to said stationary member and with respect to said cooperating member.

9. In apparatus of the character described, a plurality of parallel cylinders angularly spaced about a common axis, pistons reciprocable in said cylinders, a wabble member, a uniform motion universal joint containing two elements and balls cooperating therewith forming a pivot for said wabble member and constraining said wabble member to wabble, one of the two elements of said joint being angularly stationary, and the other of said two elements being secured to said wabble member, said joint being so positioned that the wabble member pivots about a point lying in said common axis, said joint being adjustable axially of said axis, an axially fixed shaft mounted coaxial with said axis, means operatively connecting the wabble member with said pistons, and means comprising a mass-balance member for operatively connecting the wabble member with said shaft.

10. In apparatus of the character described, a plurality of cylinders angularly spaced about a common axis, pistons reciprocable in said cylinders, an angularly stationary spherical bearing centered at a point on said axis but adjustable along said axis, a wabble member, a uniform motion universal joint comprising two elements and intermediate cooperating means for constraining said wabble member to wabble, said cooperating means being movable with respect to each of said two elements, one of said two elements being part of said spherical bearing, the other of said two elements being connected with said wabble member, means operatively connecting the wabble member and the pistons so that one moves on movement of the other, an axially fixed shaft journaled coaxial with said axis, and means operatively connecting the wabble member with said shaft to move one on motion of the other and adapted to change the inclination of the wabble member upon axial adjustment of said spherical bearing.

11. In apparatus of the character described, a plurality of parallel cylinders angularly spaced about a common axis, pistons reciprocable in said cylinders, supporting means adjustable lengthwise of said axis, a wabble member pivoted on said supporting means on a center lying on said axis, means operatively connecting said wabble member with said pistons, an axially fixed shaft journaled coaxially with said axis, and means operatively connecting said wabble member with said shaft and constructed to change the inclination of said wabble member upon axial adjustment of said center, said last-named connecting means comprising a mass element rotatably mounted on said wabble member so as to partake in said change of inclination and means for connecting said mass element to said shaft to rotate with said shaft, the major principal direction of said mass element being inclined to the central plane of said wabble member.

12. In apparatus of the character described, a plurality of parallel cylinders angularly spaced about a common axis, pistons reciprocable in said cylinders, a wabble member adjustable along said axis and adapted to pivot about a center on said axis, a second member disposed to have a constant axial relationship with said pivot and with said wabble member and rotatable relative to said wabble member, an axially fixed shaft journaled coaxial with said axis, means operatively connecting the pistons with the wabble member, and means operatively connecting the second named member with said shaft comprising a pivot disposed at a fixed distance from the first named pivot and having an axis inclined to the axis of the second-named member, and a head rigidly connected with said shaft and provided with a way for constraining the second named pivot to move in a path inclined to said axis on axial adjustment of said wabble member whereby to change the angular inclination of the wabble member on axial adjustment thereof.

13. In apparatus of the character described, a plurality of parallel cylinders angularly spaced about a common axis, pistons reciprocable in said cylinders, an angularly stationary element adjustable lengthwise of said axis, a wabble member, means operatively connecting the wabble member with said element and constraining the wabble member to move about a center lying on said axis, a member journaled on said wabble member, an axially fixed shaft journaled coaxially with said axis, means operatively connecting the pistons with the wabble member, and means operatively connecting the second member with said shaft comprising pins which are secured to the second member at right angles to the axis of the second member and at a fixed distance from said center, and a head rigidly connected with the engine shaft and provided with means for guiding said pins in a path generally inclined to the first named axis upon adjustment of said element.

14. In apparatus of the character described, a plurality of parallel cylinders angularly spaced about a common axis, pistons reciprocable in said cylinders, an angularly stationary element adjustable lengthwise of said axis, a wabble member, means operatively connecting the wabble member with said element and constraining said wabble member to move about a center lying on said axis, a member journaled on said wabble member, means operatively connecting the pistons with the wabble member, an axially fixed shaft journaled coaxially with said axis, and means operatively connecting the second member with the shaft comprising a pair of coaxial pins which are secured to the second member and disposed at right angles to the axis of said second member, rollers rotatably mounted on said pins, and a head rigidly connected with said shaft and provided with a way, in which the rollers are engaged, which is generally inclined to said common axis.

15. In apparatus of the character described, a plurality of parallel cylinders angularly disposed about a common axis, pistons reciprocable in said cylinders, a wabble member having an axis inclined to said common axis and adapted to pivot about a point lying on the common axis, a fly-wheel journaled on the wabble member coaxially thereof, means operatively connecting the pistons with the wabble member, a shaft journaled coaxially of the common axis, means operatively connecting the fly-wheel with the shaft to rotate therewith, and means constraining the wabble member to perform a uniform planetary motion on uniform rotation of the shaft.

16. In apparatus of the character described, a plurality of parallel cylinders angularly spaced about a common axis, pistons reciprocable therein, a wabble member having an axis inclined to the common axis and adapted to pivot about a point lying on the common axis, a fly-wheel journaled on the wabble member coaxially thereof, means operatively connecting the pistons with the wabble member, a shaft journaled coaxially of said common axis, and means operatively connecting the fly-wheel with said shaft to rotate therewith, the side of said fly-wheel, which faces the pistons, being disposed in two different planes.

17. In apparatus of the character described, a plurality of parallel cylinders angularly spaced about a common axis, pistons reciprocable therein, a uniform motion universal joint, a wabble member mounted on said joint to pivot about a center lying on said common axis, a fly-wheel journaled on the wabble member for rotation relative thereto about an axis inclined to said common axis, a shaft coaxial with said common axis and inclined to the axis of the fly-wheel, means operatively connecting the pistons with the wabble member, and means operatively connecting the fly-wheel with the shaft to rotate therewith.

18. In apparatus of the character described, a plurality of parallel cylinders angularly spaced about a common axis, pistons reciprocable therein, a wabble member, an angularly fixed support for the wabble member on which the wabble member is mounted to pivot about a center lying in said common axis, said support being adjustable along the common axis, a fly-wheel journaled on the wabble member, a shaft whose axis extends in the direction of the common axis, and means operatively connecting the fly-wheel with the shaft at a point offset from the axis of the shaft, said means being adjustable on adjustment of said support to vary the offset of the point of connection of the fly-wheel with the shaft and to vary the angle of tilt of the wabble member about its pivot.

19. In apparatus of the character described, a plurality of parallel cylinders angularly spaced about a common axis, pistons reciprocable in said cylinders, an angularly stationary spherical bearing centered at a point on said axis and adjustable along said axis, a wabble member pivotally mounted on said bearing, means operatively connecting the wabble member to the pistons so that one moves on movement of the other, an axially fixed shaft coaxial with said common shaft, and means for connecting the wabble member with the shaft so that one moves on movement of the other, said last-named means comprising a guide-slot provided in one of said two parts and a roller mounted on the other part for rotation on an axis perpendicular to the axis of said other part and engaged in the slot, said guide-slot being inclined to the axis of said shaft so that the inclination of the wabble member is changed on axial adjustment of said bearing.

20. In apparatus of the character described, a plurality of cylinders spaced about a common axis, pistons reciprocable in said cylinders, a wabble member having an axis disposed at an angle to said common axis and passing through a point lying on said common axis, said wabble member being mounted to be adjustable in the direction of said common axis, means operatively connecting the pistons to the wabble member, an axially fixed shaft mounted coaxial with said common axis, means operatively connecting said shaft with the wabble member, said last-named connection being such, also, as to change the inclination of the wabble member upon adjustment of said wabble member along said common axis and to constrain the axis of the wabble member to describe a conical surface about said shaft in any one fixed position of adjustment of the wabble member, means constraining said wabble member to perform a uniform planetary motion about said common axis in any one fixed position of adjustment, and a mass balance and inertia member journaled on said wabble member coaxial therewith and connected to said shaft to rotate therewith at any one fixed position of adjustment of the wabble member.

ERNEST WILDHABER.

REFERENCES CITED

The following references are of record in the file of this patent:

UNITED STATES PATENTS

| Number | Name | Date |
| --- | --- | --- |
| 812,636 | Callan | Feb. 13, 1906 |
| 1,194,258 | Walker | Aug. 8, 1916 |
| 1,204,892 | Macomber | Nov. 14, 1916 |
| 1,977,424 | Blum | Oct. 16, 1934 |
| 2,187,843 | Rzeppa | Jan. 23, 1940 |